Nov. 15, 1955 A. G. CARTER 2,723,706
PROCEDURE FOR MANUFACTURING METAL-CORED TIRES
Filed Feb. 15, 1952 3 Sheets-Sheet 1

Inventor
Andrew G. Carter
By
Attorney

Nov. 15, 1955        A. G. CARTER        2,723,706
PROCEDURE FOR MANUFACTURING METAL-CORED TIRES
Filed Feb. 15, 1952        3 Sheets-Sheet 2
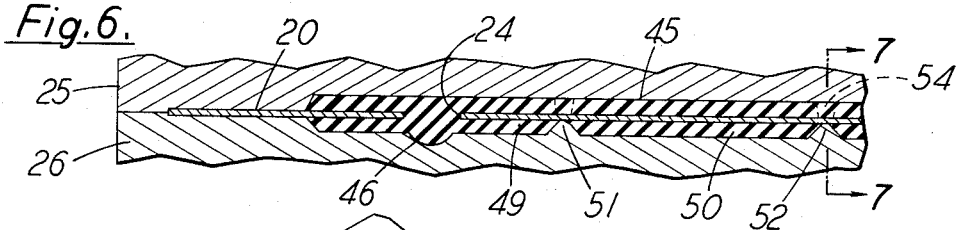
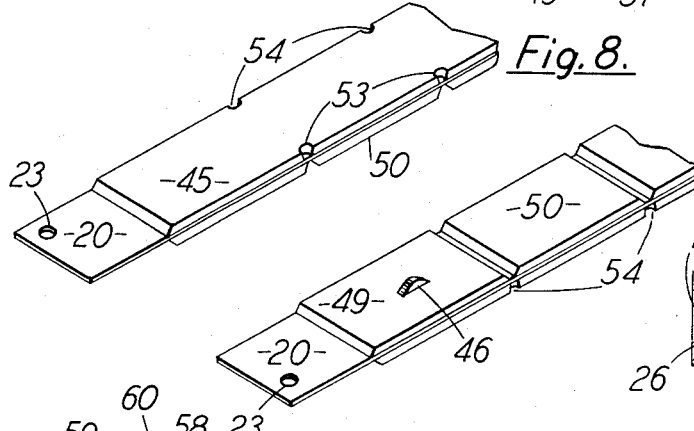
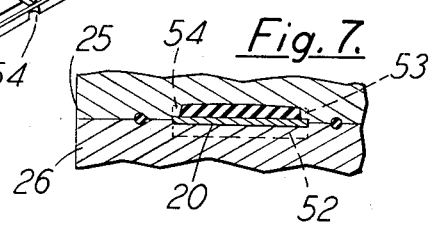
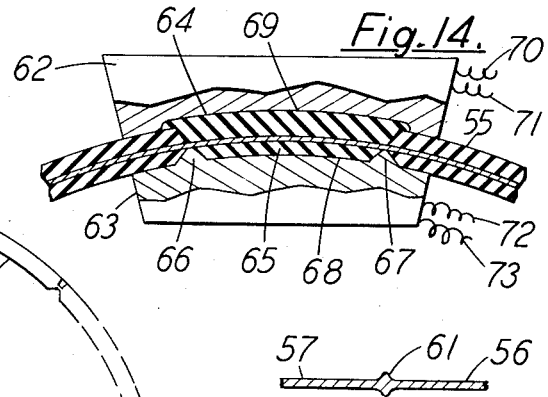
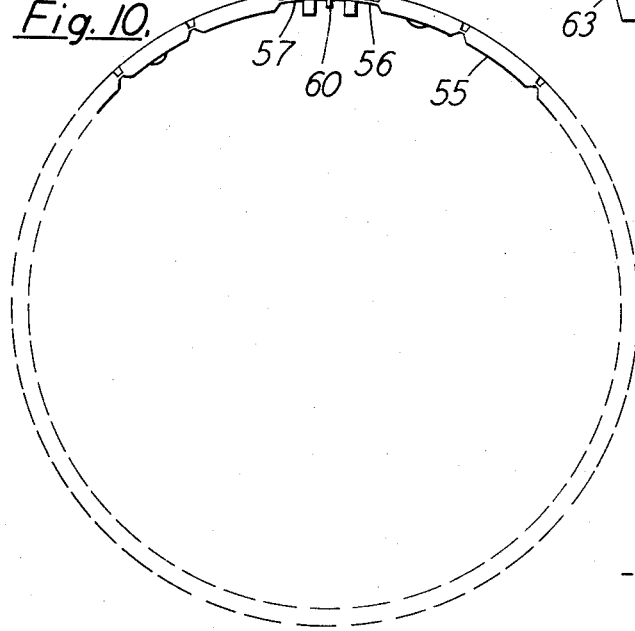
Inventor
Andrew G. Carter
By
Attorney Nov. 15, 1955     A. G. CARTER     2,723,706
PROCEDURE FOR MANUFACTURING METAL-CORED TIRES
Filed Feb. 15, 1952     3 Sheets-Sheet 3
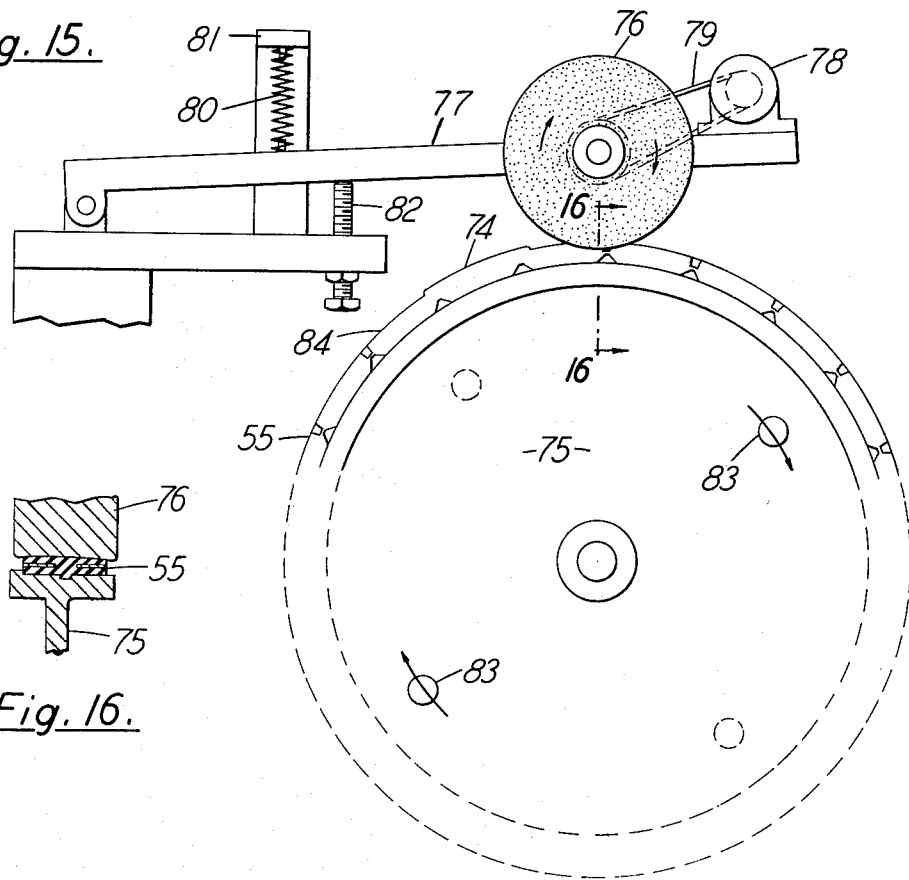
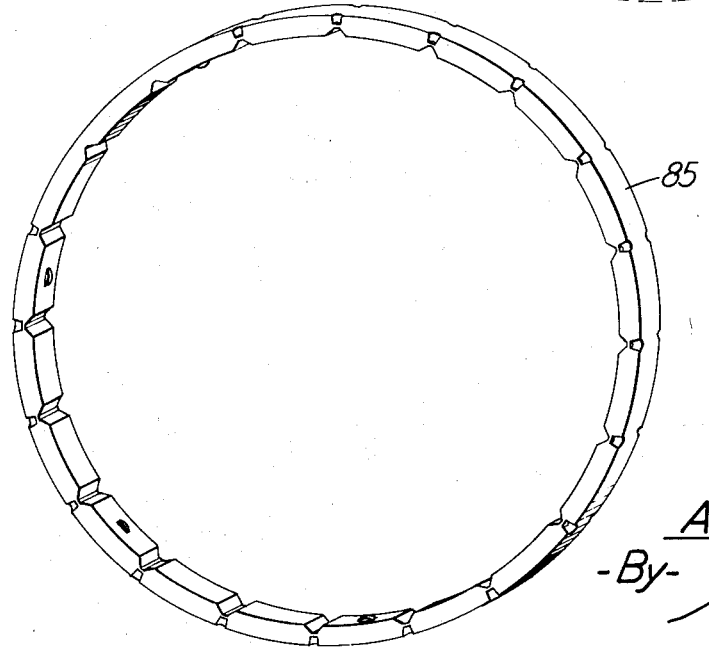
Inventor
Andrew G. Carter
-By-
Attorney

United States Patent Office 2,723,706
Patented Nov. 15, 1955

2,723,706
PROCEDURE FOR MANUFACTURING METAL-CORED TIRES

Andrew G. Carter, Grand Rapids, Mich.

Application February 15, 1952, Serial No. 271,734

7 Claims. (Cl. 154—14)

The present invention relates to the manufacture of metal-cored tires that have a substantially cylindrical core. These tires include an annular metal strip around which rubber or some other similar resilient material is molded to give the desired surface characteristics to the frame of a wheel. Band saw wheels, vehicle wheels, and processing rolls are illustrations of various types of machinery in which the metal-cored tire has been found very useful. Illustrations and detailed discussion of tires of the type discussed herein, and their combination with the wheels on which they are mounted, are to be found in my applications Serial Number 26,787 (filed on May 13, 1948), now U. S. Patent No. 2,673,469, and 153,456 (filed on April 1, 1950), now U. S. Patent No. 2,701,971.

The mass production of metal-cored tires has been limited primarily by the curing time of the rubber surfacing material. The manufacture of these articles involves the molding of the surfacing material on to the metal core in such a fashion that a firm bond is effected between these components. In order to convert the raw rubber to the finished form, it is necessary to subject the material to elevated temperatures in a mold for a considerable length of time. It will be appreciated that the manufacture of circular articles in this fashion will result in a great deal of wasted space in each mold. When once the mold has been charged, it makes little difference whether there is one article being cured inside it, or a dozen. It is the purpose of the present invention to provide a procedure for manufacturing metal-cored tires in which molding equipment may be more fully utilized so that the rate of production per dollar investment is considerably increased.

A procedure is provided by the present invention in which these tires may be molded in strips "in the flat," with the strips later joined to form a complete circle so that further operations may be performed to complete an annular tire that is uniform in cross section around its periphery. A great number of strip-shaped cavities may be formed in a mold with full utilization of the mold capacity. It is also possible to form the components of the mold so that they part in a direction parallel to the thickness of the tire. Extraction of the tires from a single mold is considerably facilitated by this provision, and it becomes possible to manufacture the mold without special consideration being given to the withdrawal of the article after the completion of the curing cycle.

The several features of the present invention will be discussed in detail through an analysis of the particular embodiments and schematic illustrations presented in the accompanying drawings. In these drawings.

Figure 3:
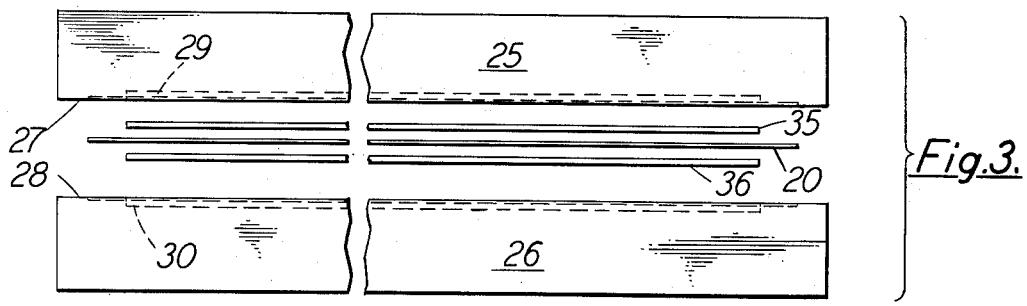
Figure 3 is an exploded view showing upper and lower components of a curing mold, together with the principal elements that are assembled into the mold to form the flat tire strip.
Figure 4:
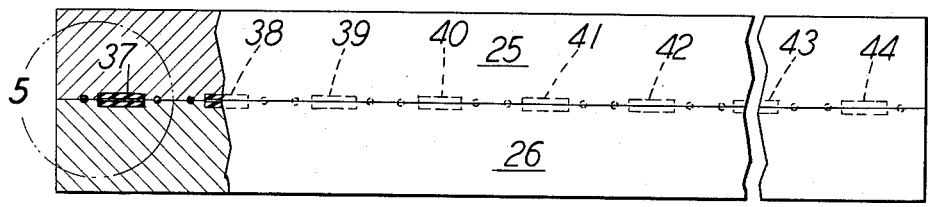

Figure 4 is a section in elevation taken of a portion of the mold illustrated in Figure 3, with a portion broken-away and shown in section. The mold of Figure 3 is shown in the closed position in Figure 4. Figures 3 and 4 are taken on respectively perpendicular planes.

Figure 5:
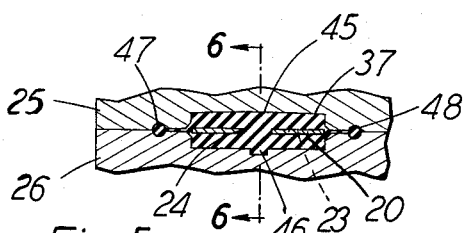

Figure 5 is an enlarged view of the area indicated at 5 in Figure 4, and showing the details of the cross section of the tire strip and its relationship to the mold.

Figure 6 is a section taken on the plane 6—6 of Figure 5 and illustrating a section of the tire and mold along a plane substantially parallel to the strip.

Figure 7 presents a view taken on the plane 7—7 of Figure 6.

Figure 8 presents a perspective view of a portion of a tire strip formed with the equipment illustrated in previous figures.

Figure 9 presents a perspective view of the opposite face of the tire illustrated in Fig. 8. The inversion of the tire element indicated in Figure 8 results in a view similar to Figure 9.

Figure 10 presents a view showing the joining of the ends of the tire strip to form an annular unit, with schematic representation of the welding equipment used in this step.

Figure 11 illustrates the operation of a spacing gauge in the welding operation.

Figure 12 illustrates an enlarged section showing the point where the two ends of the strip are united by the welding operation.

Figure 13 shows the same portion of the metal core as indicated in Figure 12, after the "flash" has been ground off.

Figure 14 shows the manner of filling in the area adjacent the weld with added rubber in an auxiliary mold.

Figure 15 illustrates in schematic form the equipment used to machine the surface of the tire at the point of the addition of the added rubber adjacent the weld.

Figure 16 presents a view on the plane 16—16 of Figure 15.

Figure 17 illustrates a completed tire manufactured according to the steps illustrated in the previous views and as described herein.

Figure 1:
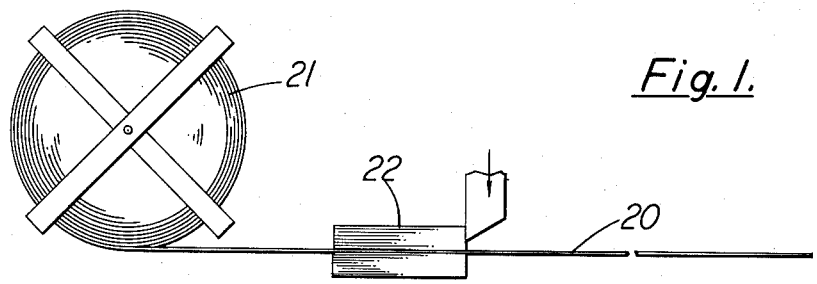
Figure 1 is a schematic diagram showing the manner in which coiled stock is sheared into strips to form individual cores for tires.
Figure 2:
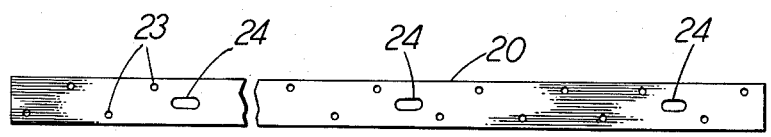
Figure 2 is a plan view of a metal core strip.

Referring to Figure 1, a strip of metal core material 20 is shown being removed from a spool 21. The strip is caused to pass through a shearing machine generally indicated at 22 having the function of shearing the strip into exact lengths to form the metal core of the completed tires, allowances being made for the welding operation to be discussed hereinafter. A section of this strip is shown in plan in Figure 2. A series of perforations 23 is continuous along the entire length of the strip, and provides apertures through which the surfacing material (usually rubber) may flow through between one side and another of the strip to equalize the pressure in the molding operation. A series of elongated apertures 24 also appears in the strip shown in Figure 2, and provides an opening opposite which molded rubber projections may be formed to aid in securing the tire on the frame of the wheel. The action of the apertures 23 and 24 is discussed in the applications referred to above. In order to facilitate the bonding of the rubber surfacing material to the metal core, it is preferable that the coiled strip be brass-plated. Plating of metal components to be bonded to rubber is a standard procedure, and forms no part of the present invention.

Referring to Figure 3, a molding die is illustrated which includes the upper component 25 and the lower component 26. Each of the components 25 and 26 has its mating surfaces 27 and 28 machined so as to form opposite cavities as indicated at 29 and 30, each representing a portion of the completed tire strip. The mold components 25 and 26 are usually heated by steam equipment while held together in a press during the curing of the rubber material molded to the metal strip 20. In the exploded view indicated in Figure 3, a section of the core strip 20 is shown disposed between the molding die components 25 and 26, and strips of raw rubber 35 and 36 are shown in position on either side of the core.

Referring to Figure 4, the die components 25 and 26 are shown in closed position with a series of cavities arranged in parallel relationship on the mating faces. Figure 4 is taken on a plane perpendicular to the length of the strips, and illustrates a series of cavities 37, 38, 39, 40, 41, 42, 43, and 44. Referring to the enlarged view of the cavity 37 as illustrated in Figure 5, it will be noted that the upper surface 45 of the tire is formed slightly convex, establishing the proper curvature for centering the blade of a band saw. The core member 20 is shown in position, and the flow hole 23 permits communication between opposite sides of the core member so that the rubber applied to those areas may flow to equalize the pressure and thus maintain the position of the metal core member within the mold. The aperture 24 is shown opposite the molded rubber projection 46, and is of such dimensions as to permit a flow of rubber through the aperture 24 when the projection 46 is compressed during the process of inserting the completed tire on the frame of a wheel. After the projection 46 is snapped into engagement with a suitable groove or recess, the material again flows back through the aperture 24. Suitable overflow cavities as indicated at 47 and 48 are also provided in the mold components 25 and 26 to permit the excess rubber to leave the principal portion of the cavity. Suitable channels communicate between the cavities 47 and 48 and the main portion of the cavity to conduct such overflow material.

Referring to Figures 6 and 7, it will be noted that the underside of the tire member is broken up into a series of pads 49 and 50 spaced apart along the length of the strip, and separated by the members 51 and 52 of the mold which bear directly upon the metal core 20. These members 51 and 52 not only serve to establish the separation of the pads, but also accurately position the core within the surface material. This provision serves to provide a uniform cross-sectional relationship between the core and the surface material throughout the periphery of the completed tire. The members 51 and 52 extend across the entire width of the tire, in the type of tire shown in the drawings. At the sides of the tire opposite each of the members 51 and 52, provision is made on the mold for securely gripping the metal core 20 and forcing it down into engagement with the members 51 and 52. The recesses indicated at 53 and 54 in Figure 7 form areas in which a suitable member associated with the mold component 25 will engage the core member 20 so that the core becomes effectively clamped between the mold components. Referring to Figures 8 and 9, perspective views are indicated from opposite sides of the molded strip produced in the manner described above.

Referring to Figure 10, the strip 55 is shown formed as outlined above, with the ends 56 and 57 brought around together to form a hoop. The ends 56 and 57 are securely grasped within the jaws 58 and 59 respectively of a welding device, and are spaced apart by a spacer gauge 60. It is conventional that a butt welding machine provides for a definite amount of movement of the welded components toward one another during the welding operation. The thickness of the spacer gauge is selected so that the proper amount of overtravel is maintained to assure adequate working of the metal at the point of weld. This action results in a type of forging operation resulting in the expansion of the metal at that point and improving the structure of the weld as a result. After the ends 56 and 57 have been securely clamped in the jaw members 58 and 59, the spacer gauge is withdrawn as indicated in Figure 11. The welding operation may then take place, resulting in the moving together of the jaw members and the accumulation of an increased thickness of metal at the weld point 61. The excess material over the continuous thickness of the strip 20 is machined off as indicated in Figure 13 in dotted lines, so as to avoid accumulating a non-uniform section of metal which might otherwise distort the balance of the completed wheel.

Referring to Figure 14, the tire strip 55 is placed in an auxiliary mold formed by the upper component 62 and the lower component 63 which establish an arcuate cavity within which added raw rubber material as indicated at 64 and 65 is inserted at the openings opposite the exposed ends 56 and 57 of the core. The length of the area filled by the rubber 65 is such that the cavity for it can be conveniently terminated by the members 66 and 67 which are at the same uniform spacing as is used for the peripherally-spaced pads around the inside surface of the tire as previously discussed. It is preferable that the inner surface 68 be molded to its exact desired contour and that the cavity forming the outer surface 69 be machined so as to provide for an excess of rubber to be removed at a later operation. It is extremely difficult to mold both the inner and outer surfaces to exact dimension, and it is preferable to permit an excess to accumulate on the outside to be removed as will be discussed hereinafter. The upper and lower auxiliary mold components 62 and 63 are each provided with the electrical leads 70, 71, 72, and 73 to supply electrical energy for maintaining the components at the elevated temperature necessary for curing. After the tire strip 55 has been removed from the auxiliary mold shown in Figure 14, the tire will appear uniform in cross section around its periphery except for the raised area 74. This area is removed by the equipment schematically illustrated in Figure 15. The tire hoop 55 is slipped on a wheel frame 75 which accurately positions the tire into a circle. A grinding wheel 76 is supported on a beam 77, and is driven by the motor 78 through the belt 79. The beam 77 is biased so as to force the wheel 76 into engagement with the tire hoop 55 by the action of the spring 80 acting against a portion of the frame 81. An adjustable stop 82 limits the downward movement of the wheel so as to control the thickness of the tire at the point against which the wheel operates. In operation, the beam 77 is elevated a sufficient amount to admit the tire hoop 55, and is then lowered so that the grinding operation may begin. An oscillating movement of the wheel (induced by actuating the handle 83) such as to bring the enlarged portion 74 under the influence of the grinding wheel 76 will suffice to remove the excess of material at that point so that the outer surface 84 of the completed tire will be uniform around the periphery. Figure 16 illustrates the relationship between the wheel 76, the tire hoop 55, and the wheel frame 75. After the removal of the tire from the frame 75 on completion of the machining operation to remove the projected area 74, the completed tire 85 will be found to have all of the functional characteristics of a tire that is originally molded in a circular form. The balance of the unit will be substantially undistorted, and the cost savings will be considerable over the amount that would be involved in the circular molding operation.

The particular embodiments and procedures illustrated and discussed herein are for illustrative purposes only and are not to be considered as a limitation upon the scope of the appended claims. In these claims, it is my intention to claim the entire invention disclosed herein except as I am limited by the prior art.

I claim:

1. A method of manufacturing a tire for a wheel, said tire having a metal core and molded resilient material secured to said core, comprising: molding said material on a strip of metal core leaving exposed portions at the ends thereof, the length of said strip being selected to substantially correspond to the circumferential length of said core, said core being clamped between components of a mold at exposed areas on said core at intermediate points between the ends thereof; bringing the said exposed ends together in opposite relationship to form a loop of uniform curvature and uniting the same by butt-welding; fill-in molding an excess of said resilient material in the area at said exposed ends beyond the amount required to establish a substantially uniform cross-section for said tire around the periphery thereof; and trimming off the excess of said resilient material filled in.

2. A method of manufacturing a tire for a wheel, said tire having a metal core and molded resilient material secured to said core, comprising: molding said material on a strip of metal core leaving exposed portions at the ends thereof, the length of said strip being selected to substantially correspond to the circumferential length of said core; bringing the said exposed ends together to form a loop of uniform curvature and uniting the same by butt-welding; fill-in molding an excess of said resilient material in the area at said exposed ends beyond the amount required to establish a substantially uniform cross-section for said tire around the periphery thereof; and trimming off the excess of said resilient material filled in.

3. A method of manufacturing a tire for a wheel, said tire having a metal core and molded resilient material secured to said core, comprising: molding said material on a strip of metal core leaving exposed portions at the ends thereof, said core being clamped between components of a mold at exposed areas on said core at intermediate points between the ends thereof; bringing the said exposed ends together and uniting the same; and fill-in molding a quantity of said resilient material in the area at said exposed ends to establish a substantially uniform cross-section for said tire around the periphery thereof.

4. A method of manufacturing a tire for a wheel, said tire having a metal core and molded resilient material secured to said core, comprising: molding said material on a strip of metal core leaving exposed portions at the ends thereof; bringing the said exposed ends together to form a loop of uniform curvature and uniting the same by fusion; fill-in molding an excess of said resilient material in the area at said exposed ends beyond the amount required to establish a substantially uniform cross-section for said tire around the periphery thereof; and trimming off the excess of said resilient material filled in.

5. A method of manufacturing a tire for a wheel, said tire having a metal core and molded resilient material secured to said core, comprising: molding said material on a strip of metal core leaving exposed portions at the ends thereof; bringing the said exposed ends together in opposite relationship to form a loop of uniform curvature and uniting the same by fusion; and fill-in molding a quantity of resilient material in the area at said exposed ends to establish a substantially uniform cross-section for said tire around the periphery thereof.

6. A method of manufacturing a tire for a wheel, said tire having a metal core and resilient material secured to said core, comprising: securing said material on a strip of metal core accurately in predetermined relationship to said core leaving portions of said core exposed adjacent the ends thereof; bringing the said ends together to form a loop and uniting the same while gripping said core to position said ends; and fill-in molding a quantity of resilient material at said exposed portions to establish a substantially uniform cross-section around the periphery of said tire.

7. A method of manufacturing a tire for a wheel, said tire having a metal core and resilient material secured to said core, comprising: securing said material on a strip of metal core accurately in predetermined relationship to said core leaving portions of said core exposed adjacent the ends thereof; bringing the said ends together to form a loop and uniting the same by fusion while gripping said exposed portions to position said ends; and fill-in molding a quantity of resilient material at said exposed portions to establish a substantially uniform cross-section around the periphery of said tire leaving said core exposed at least at one point and supporting the same at said point during said fill-in molding.

References Cited in the file of this patent

UNITED STATES PATENTS

| | | |
|---|---|---|
| 1,492,363 | Edson | Nov. 7, 1924 |
| 1,548,843 | Korn | Aug. 11, 1925 |
| 1,887,019 | Hart | Nov. 8, 1932 |
| 2,086,857 | Derby | July 13, 1937 |
| 2,501,644 | Kraft et al. | Mar. 21, 1950 |
| 2,525,196 | Bacon | Oct. 10, 1950 |
| 2,529,348 | Mustee | Nov. 7, 1950 |
| 2,530,163 | Goodwin | Nov. 14, 1950 |
| 2,556,264 | Flynn | June 12, 1951 |